United States Patent [19]
Delfino

[11] 3,834,140
[45] Sept. 10, 1974

[54] HAY RAKE TOOTH AND MOUNTING BASE

[76] Inventor: Willie Delfino, Rt. No. 7 Box 148, Bakersfield, Calif. 93307

[22] Filed: Aug. 20, 1973

[21] Appl. No.: 390,135

[52] U.S. Cl. .................................................. 56/400
[51] Int. Cl. ........................................... A01d 77/00
[58] Field of Search ............ 56/400, 365, 366, 367, 56/370, 371, 372, 375, 376, 377

[56] References Cited
UNITED STATES PATENTS

| | | | |
|---|---|---|---|
| 2,712,723 | 7/1955 | Ryan | 56/400 |
| 2,722,799 | 11/1955 | Cooley | 56/400 |
| 3,401,515 | 9/1968 | Fisbaugh | 56/400 |
| 3,664,107 | 5/1972 | Keller | 56/400 |

*Primary Examiner*—Russell R. Kinsey
*Attorney, Agent, or Firm*—Robert K. Rhea

[57] ABSTRACT

A dual tooth for a side delivery hay rake is secured to the rim of the hay rake wheel by a bolt passing through a reuseable recessed base and the rim of the rake wheel. The respective ends of the base is provided with outstanding resilient members respectively surrounding the teeth at their end portions adjacent the rake wheel rim to cushion stress applied to the teeth.

5 Claims, 6 Drawing Figures

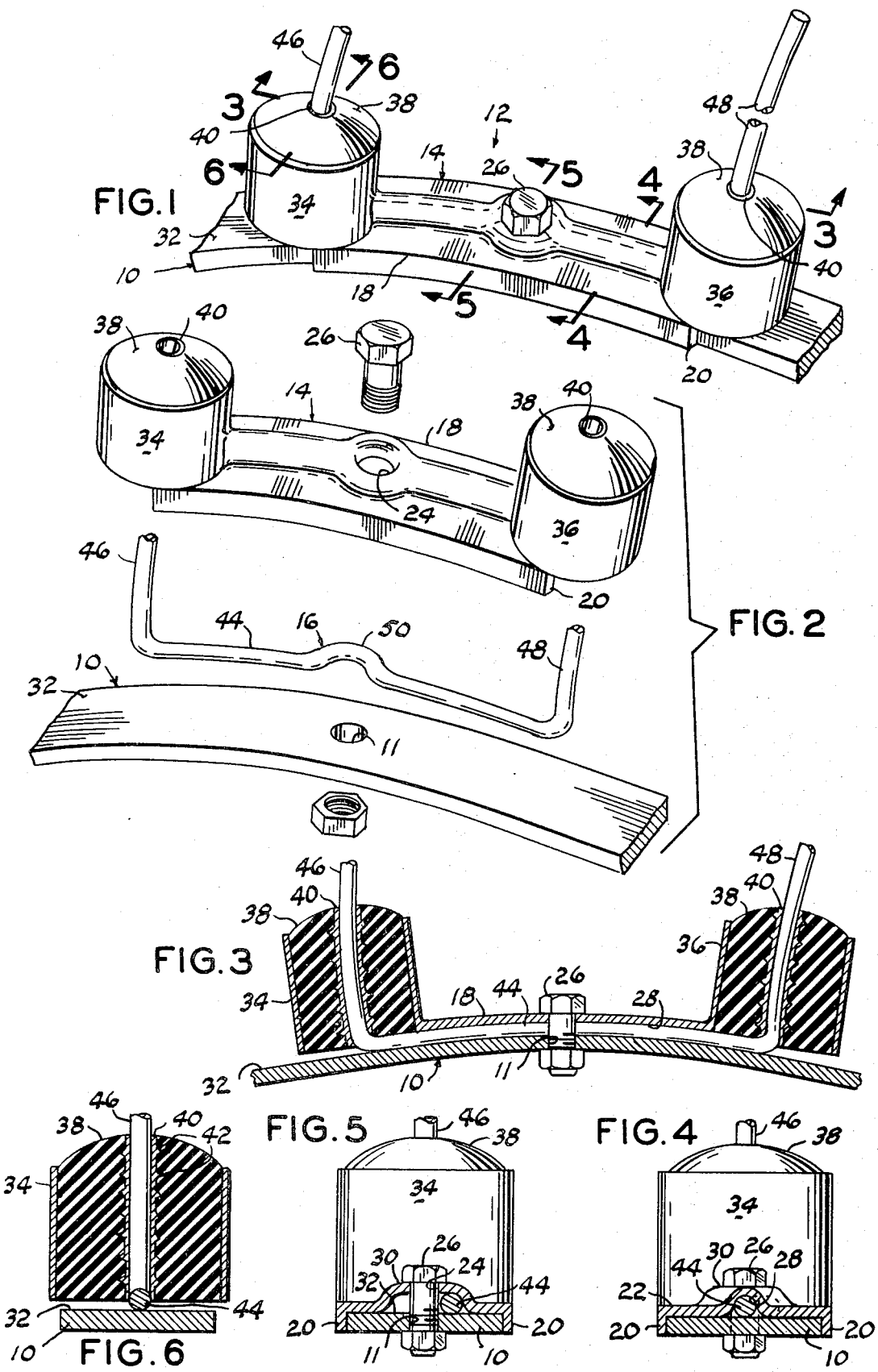

HAY RAKE TOOTH AND MOUNTING BASE

BACKGROUND OF THE INVENTION

1. Field of the Invention

The present invention relates to side delivery rakes and more particularly to a dual tooth structure and reuseable base member for mounting a dual tooth structure on the rim of a side delivery hay rake wheel.

2. Description of the Prior Art

Recent patents relating to side delivery hay rake teeth and their mounting means have generally been directed toward providing a block of rubber, or the like, to which one end of a rake tooth is secured with the rubber being bonded or attached to a bracket removably attached to a hay rake wheel rim or a hay rake bar. The purpose of the resilient mounting member is to permit the rake teeth to be deflected when encountering an obstruction and bypass it without loosing contact with the hay or crop being raked. This type of mounting is an improvement over the earlier type rake teeth which were helically wound in coil spring fashion adjacent their connection with the hay rake wheel rim or rail in that the resilient member withstands a greater proportion of the stress consistently applied to the rake tooth or tine.

The above resilient type mounting means and teeth are disclosed by U.S. Pat. Nos. 3,102,377; 3,151,436; 3,186,153 and 3,192,696.

The principle objection to the above described resilient tooth mounting means is that the base member connecting the tooth and resilient block to a hay rake rail or wheel rim necessitates discarding both the damaged tooth being replaced and its mounting means.

This invention provides a dual tooth for hay rakes of this type wherein two tines are joined in U-shaped fashion by a bight portion which is removably connected with a hay rake wheel rim by a base member wherein only the damaged tine unit is removed and discarded and the base is again used with a replacement dual tooth structure.

SUMMARY OF THE INVENTION

A pair of tines are joined in U-shaped fashion by a bight portion adapted to contact a peripheral portion of a hay rake wheel rim and be held thereon by a dual tooth mounting base comprising an elongated channel-shaped member, in cross section, having a recess for nesting the bight portion of the dual tooth structure which is secured to a peripheral portion of a hay rake wheel rim by bolt and nut means passing through the channel and wheel rim. The respective end portions of the channel member is provided with cylindrical sleeve members containing a section of elastomer material, such as rubber, which is apertured and provided with a bushing slidably receiving the tines of the tooth structure and surrounding the later adjacent their connection with the bight portion of the U-shaped tooth.

The principle object of this invention is to provide a dual tooth structure for a hay rake and a mounting base for connecting the tooth structure to the rim of a hay rake wheel wherein the mounting base may be retained and used when replacing damaged rake teeth.

BRIEF DESCRIPTION OF THE DRAWINGS

FIG. 1 is a fragmentary perspective view illustrating the relative position of the dual tooth and base mount secured to a fragment of a hay rake wheel rim;

FIG. 2 is an exploded perspective view of the components of FIG. 1; and,

FIGS. 3, 4, 5 and 6 are vertical cross-sectional views taken respectively along the lines 3—3, 4—4, 5—5 and 6—6.

DESCRIPTION OF THE PREFERRED EMBODIMENT

Like characters of reference designate like parts in those figures of the drawings in which they occur.

In the drawings:

The reference numeral 10 indicates a circumferential arc of a felly or rim of a side delivery hay rake wheel forming a tine support for handling crops. In the example shown, the rim 10 is rectangular in cross section and is provided with circumferentially spaced bolt receiving holes 11, only one being shown.

The numeral 12 indicates the device, as a whole, comprising a base 14 and a dual tooth unit 16. The base 14 comprises an elongated channel member 18, U-shaped in cross-section, arcuately curved longitudinally to overlie a circumferential arc of the rake wheel rim 10 and includes channel leg portions 20, respectively, contiguously contacting marginal side edge surfaces of the rim. The bight portion 22 of the channel member is transversely apertured, as at 24, for receiving a bolt 26 which projects through the rim aperture 24 and secures the channel member to the rim. The bight portion 22, of the channel member, is longitudinally provided with an arcuate recess 28 projecting above the plane of the channel member bight portion 22, as viewed in the drawings. Intermediate its ends and around the position of the aperture 24, the recess is enlarged transversely of its longitudinal axis to form an upper surface 30 substantially parallel with the outer surface 32 of the rim 10 for cooperative engagement by the head of the bolt 26. A pair of open end cylindrical sleeves 34 and 36 are connected, respectively, to the end portions of the channel member 18 with the axis of each sleeve directed radially outwardly from the rim 10. Each of the sleeves is filled with and bonded to elastomer material, such as rubber, preferably terminating in an arcuate end surface projecting outward beyond the end of the respective sleeve opposite the rim, thus forming a resilient block 38, at each end of the base. Each of the blocks are centrally apertured and provided with a sleeve bushing 40 bonded to the elastomer material. The sleeve bushing 40 is provided with a plurality of outstanding projections 42 to insure that the sleeve bushing remains in place.

The dual tooth 16 is substantially U-shaped in general configuration having a bight portion 44 arcuately curved longitudinally to conform to an arc of the rim 10 and includes a pair of legs 46 and 48 forming crop engaging tines. Intermediate its ends, the tooth bight portion 44 is arcuately curved laterally medially its ends, as at 50, in a semicircular fashion for nesting a peripheral arc of the bolt 26. The bight portion 44 of the tooth is interposed between the channel member 18 and the outer surface 32 of the rim and is nested by the channel recess 28.

The tine forming legs 46 and 48 of the tooth are cooperatively received by the sleeve bushings 40 so that the tooth legs 46 and 48 substantially project in a radial direction outwardly from the rim 10.

OPERATION

Assuming the device 12 is in operative position on the rim 10, as shown by FIG. 1, and that one or both of the tooth legs 46 or 48 have been damaged necessitating its replacement, the device 12 is disconnected from the rim 10 by simply removing the bolt and nut 26 and removing the tooth legs 46 and 48 from within the block sleeve bushings 40 by sliding the blocks off the remaining portion of the tooth legs. A new tooth 16 is then positioned within the blocks 38 by sliding the sleeve bushings over the free end of the tooth legs 46 and 48 so that the base channel recess 28 nests the tooth bight portion 44. The base 14 is then placed on the rim 10 and the bolt and nut again used to clamp the base to the rim.

During crop handling use the resilient blocks 38 permit considerable flexing or movement of the tines when passing over obstacles and returning them to the desired position without losing contact with the crop being gathered. The semicircular off-set 50 prevents rotation of the tooth legs 46 and 48 about the longitudinal axis of the tooth bight portion 44.

Obviusly the invention is susceptible to changes or alterations without defeating its practicability, therefore, I do not wish to be confined to the preferred embodiment shown in the drawings and described herein.

I claim:

1. A crop engaging means for mounting on the rim of a supporting wheel of a crop-handling machine, comprising:

a base member including an elongated channel portion adapted to overlie a circumferential arc of said rim, said base member having a centrally apertured block of elastomer material secured to its respective end portions;

a substantially U-shaped tooth having a bight portion adapted to be interposed between said channel portion and said rim and having leg portions forming crop engaging tines respectively projecting through the apertures in said blocks in a radial direction with respect to said rim; and, bolt means adapted to extend through apertures in said base member and rim to secure said base member to said rim.

2. The crop engaging means according to claim 1 in which said base member further includes:

a cylindrical sleeve secured to said channel portion and surrounding each said block; and, a sleeve bushing within the aperture of each said block.

3. The crop engaging means according to claim 2 in which said channel member is characterized by a longitudinally extending recess for nesting the bight portion of said U-shaped tooth.

4. The crop engaging means according to claim 3 in which the bolt means includes a bolt extending through said rim and channel portion apertures medially the ends of the latter.

5. The crop engaging means according to claim 4 in which the bight portion of said U-shaped tooth is characterized by a substantially semicircular arcuate portion partially surrounding said bolt for preventing rotation of the tine forming legs of said U-shaped tooth about the axis of its bight portion.

* * * * *